UNITED STATES PATENT OFFICE.

PETER ADAM SCHMITT, OF HAMBURG, GERMANY.

MANUFACTURE OF FOOD FATS MORE PARTICULARLY FOR THE PREPARATION OF PASTRIES AND THE LIKE.

1,102,551.  Specification of Letters Patent.  Patented July 7, 1914.

No Drawing.  Application filed July 10, 1913.  Serial No. 778,401.

*To all whom it may concern:*

Be it known that I, PETER ADAM SCHMITT, a subject of the German Emperor, and resident of No. 51 Gr. Reichenstrasse ptr., Hamburg, Germany, have invented certain new and useful Improvements in or Relating to the Manufacture of Food Fats More Particularly for the Preparation of Pastries and the like, of which the following is a specification.

This invention relates to a process for the manufacture of food fats to be used more particularly in the preparation of food articles such as pastries in which it is of importance on the one hand to protect the fats against the injurious influence of alkaline active substances and on the other hand to embody in the product a particularly effective binding agent.

The fats and particularly the vegetable fats are extremely sensitive to alkalis as they are liable to be readily decomposed thereby with the formation of soap. Consequently in employing the usual alkaline reactive substances such as potash, baking powder, and the like, vegetable butter could hitherto not be used for baking purpose because the baked articles owing to the soap generated therein are deficient in their taste or become uneatable. Even if yeast is used as a "raising" medium the vegetable powder is unsuitable for the preparation of pastries because the dough is not sufficiently raised, and does not remain consistent, but in the heat of the baking oven is caused to flow apart.

Now according to the present invention the vegetable butter during its production receives an addition of soluble albumen at a temperature which precludes the coagulation thereof. The albumen may be added to the emulsifying agent or to the mixture of the fats with water or milk during or after emulsification. The result is that the butter is entirely permeated with albumen which incloses the fat particles and protects them against the decomposing effects of alkalis. Moreover the albumen forms an excellent binding medium adapted to hold together the rising dough during the baking process and thus preventing the dough from falling apart and breaking down.

The margarin which is obtained from animal fats is more resistant to alkalis than vegetable butter and by its use for baking purpose a rising and remaining stationary of the dough is to some extent attained. However, even margarin of this kind may be rendered more suitable for baking purpose if albumen is also embodied therein.

The process may be carried into effect for example in the following manner. The albumen is added at a temperature which prevents coagulation to the emulsifying agent used for binding the vegetable fats to the milk or water. If a solution of casein is employed as the emulsifying agent, an addition of about 20 parts of the white of fresh eggs to about 100 parts of the casein is made. Of this solution about 10 parts with about 90 parts of the mixture of vegetable fat and milk or water are converted into butter.

For the purposes of this invention water is an equivalent of milk.

What I claim is:—

Process of treating vegetable fats in order to adapt them for baking purposes, which consists in adding to a mixture of the vegetable fats with milk a solution of casein and an albumen, at a temperature which precludes the coagulation of the albumen.

Signed by me at Hamburg, Germany, this 28th day of June 1913.

PETER ADAM SCHMITT.

Witnesses:
 AUGUST WENK,
 ERNEST H. L. MUMMENHOFF.